United States Patent [19]

Dobson

[11] Patent Number: 5,016,990
[45] Date of Patent: May 21, 1991

[54] METHOD OF MODULATING AN OPTICAL BEAM

[75] Inventor: Peter J. Dobson, South Croydon, England

[73] Assignee: U.S. Philips Corp., New York, N.Y.

[21] Appl. No.: 302,717

[22] Filed: Jan. 26, 1989

[30] Foreign Application Priority Data

Feb. 12, 1988 [GB] United Kingdom ............... 8803294

[51] Int. Cl.[5] .................... G02F 1/01; G02B 5/30; H01L 27/12; H01L 49/02
[52] U.S. Cl. ................. 350/353; 350/356; 350/374; 350/355; 357/4
[58] Field of Search ............ 350/353, 354, 355, 374; 357/4

[56] References Cited

U.S. PATENT DOCUMENTS

| | | | |
|---|---|---|---|
| 4,549,788 | 10/1985 | Chemla | 350/354 |
| 4,626,075 | 12/1986 | Chemla | 350/354 |
| 4,693,547 | 9/1987 | Soref et al. | 350/354 X |
| 4,716,449 | 12/1987 | Miller | 350/354 X |
| 4,818,079 | 4/1989 | Maserjian | 350/354 |
| 4,900,134 | 2/1990 | Inoue et al. | 350/354 |

OTHER PUBLICATIONS

Applied Physics Letters 45(i), 7/1/84, pp. 13-15.
Optical Engineering, 5/87, vol. 26, No. 5, pp. 368-372.

*Primary Examiner*—Eugene R. LaRoche
*Assistant Examiner*—Michael B. Shingleton
*Attorney, Agent, or Firm*—William L. Botjer

[57] ABSTRACT

A method of modulating an optical beam (1) and apparatus for use in such a method are described. An etalon structure (2) is provided which has an absorption edge in the vicinity of the wavelength of the optical beam (1) and which comprises material of a smaller band gap, for example gallium arsenide, sandwiched between layers of material of a larger band gap, for example aluminium gallium arsenide, so that the smaller band gap material forms a quantum size effect confinement region for electrons and holes. The smaller band gap material may consist of layers (4) separated by barrier layers (3) of the larger band gap material so that the layers (4) form quantum wells. The optical beam (1) is directed through quantum size effect confinement region of the etalon structure (2) and a polarized control optical beam (5) is directed at the etalon structure (2) perpendicular to a direction of quantum size effect confinement of the etalon structure (2), thereby causing the optical beam (1) to be modulated by the control optical beam (5).

12 Claims, 3 Drawing Sheets

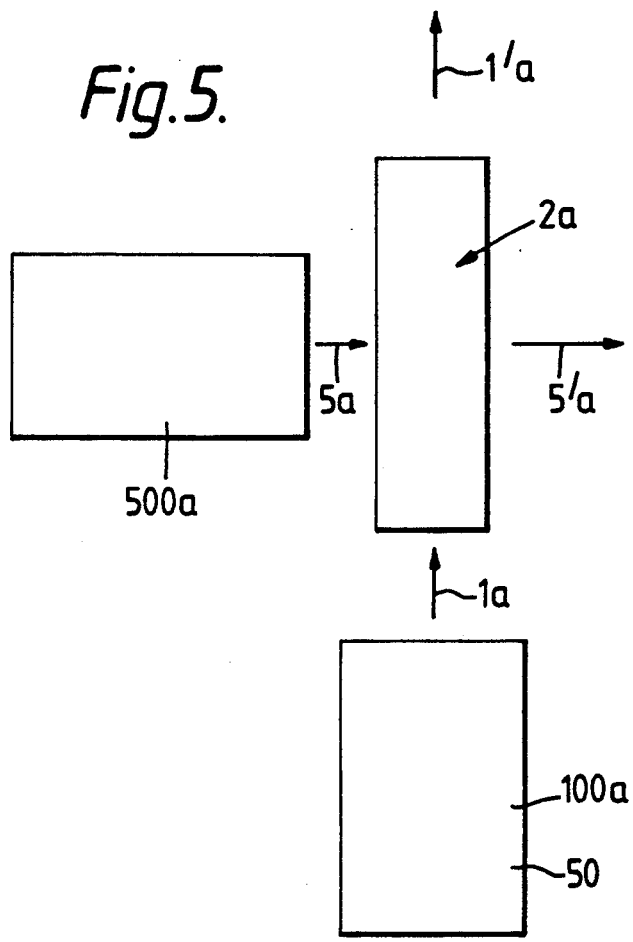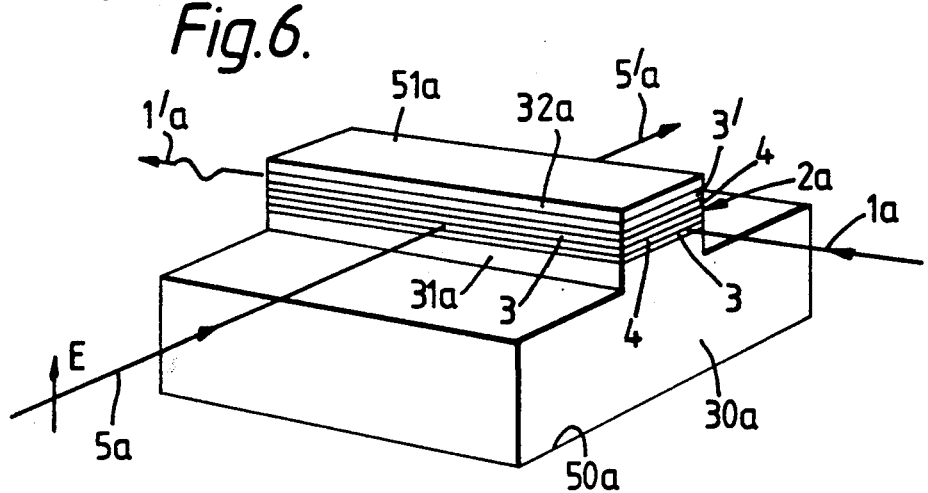

METHOD OF MODULATING AN OPTICAL BEAM

DESCRIPTION

BACKGROUND OF THE INVENTION

This invention relates to a method of modulating an optical beam and to apparatus suitable for use in such a method.

A method of modulating an optical beam has been proposed which comprises providing an etalon structure having an absorption edge in the vicinity of the wavelength of the optical beam and comprising material of a smaller band gap sandwiched between layers of material of a larger band gap so that the smaller band gap material forms a quantum size effect confinement region for electrons and holes, directing the optical beam through the quantum size effect confinement region of the etalon structure and applying an electrical field across the etalon structure to modulate the optical beam.

Such a method is described in papers by D. A. B. Miller et al published in Applied Physics Letters 45(1) July 1, 1984 at pages 13 to 15 and in Optical Engineering May 1987 Vol 26 No 5 at pages 368 to 372 and also in EP-A-135582. As explained in the aforementioned papers, quantum well etalon structures, that is structures where layers of a smaller band gap material sandwiched between layers of a larger band gap material are so thin that quantisation of the energy levels within the smaller band gap material occurs to form a quantum effect confinement region for electrons and holes, exhibit strong exciton effects. In particular, when an electric field is applied across the quantum well layers the absorption edge of the quantum well etalon structure is shifted sideways to longer wavelength but without destroying the strong exciton resonance as would occur in a bulk sample of the material. This effect is explained in the aforementioned papers as arising, put in simple terms, because of the confinement of the electron and hole making up an exciton within the quantum well which prevents the electron and hole of the exciton being totally torn apart from one another. Because of the resemblance of this effect to the Stark shift observed when an electric field is applied to hydrogen atoms, this effect has been termed the Quantum Confined Stark Effect (QCSE).

As described in the paper published in Optical Engineering, the QCSE provides a strong electro-absorption mechanism which enables changes in absorption which make possible optical modulators that are only micrometers thick and for which the transmission can be changed by more than a factor of two with voltages of from 5 to 10 volts.

EP-A-135582 describes devices which utilise the Quantum Confined Stark Effect. In particular, there are described various optical modulators in which an electrical potential in the form of a dc bias or an ac electrical potential with a frequency of say 100 GHz is applied via electrical contacts across a multiple quantum well etalon structure so as to modulate the absorption edge of the etalon structure. An optical beam to be modulated is directed into the etalon structure either perpendicularly of or along the quantum well layers of the etalon structure. EP-A-135582 also describes the application of the Quantum Confined Stark Effect to controlling the optical path length of a Fabry-Perot cavity by providing electrical contacts to enable an electrical potential to be applied across the cavity. The paper published in Optical Engineering describes a self electro-optic device in which optical rather than only electrical control is achieved by opto-electric feedback. Thus, the etalon structure may be formed as a photo-detecting diode which is incorporated in an external circuit so that the voltage across the diode which, because of the Quantum Confined Stark Effect, changes the absorption of the diode and thus the photocurrent through the diode, is controlled by the photocurrent. The opto-electronic feedback may be made positive or negative.

SUMMARY OF THE INVENTION

According to one aspect of the present invention, there is provided a method of modulating an optical beam, which method comprises providing an etalon structure having an absorption edge in the vicinity of the wavelength of the optical beam and comprising material of a smaller band gap sandwiched between layers of material of a larger band gap so that the smaller band gap material forms a quantum size effect confinement region for electrons and holes, directing the optical beam through the quantum size effect confinement region of the etalon structure and directing a polarised control optical beam at the etalon structure with the electric field of the polarised control optical beam perpendicular to a direction of quantum size effect confinement of the etalon structure to modulate the absorption edge of the etalon structure, thereby causing the optical beam to be modulated by the control optical beam.

In another aspect, the present invention provides apparatus for modulating an optical beam, which apparatus comprises an etalon structure having an absorption edge in the vicinity of the wavelength of the optical beam to be modulated and comprising material of a smaller band gap sandwiched between layers of material of a larger band gap so that the smaller band gap material forms a quantum size effect confinement region for electrons and holes, and means for directing a polarised control optical beam at the etalon structure with the electric field of the polarised control optical beam perpendicular to a direction of quantum size effect confinement of the etalon structure to modulate the absorption edge of the etalon structure to cause an optical beam passing through the quantum size effect confinement region to be modulated by the control optical beam.

As used herein, the phrase 'having an absorption edge in the vicinity of the wavelength of the optical beam' should be understood to mean that the absorption edge lies within 3 to 40 nanometers of the wavelength of the optical beam to be modulated.

Thus, by using a method and or apparatus embodying the invention, modulation of one optical beam by another can be achieved.

As used herein, the term quantum size effect confinement region should be understood to include quantum well, quantum wire and quantum dot structures. Also the term optical beam should be understood to include any electromagnetic radiation from far infrared to far ultraviolet and to include continuous and pulsed beams.

BRIEF DESCRIPTION OF THE DRAWINGS

Embodiments of the invention will now be described, by way of example, with reference to the accompanying drawings, in which:

FIG. 5 is a simplified block diagrammatic plan view of a second embodiment of apparatus in accordance with the invention; and FIG. 6 is a schematic perspective view of a second embodiment of an etalon structure for use in the apparatus shown in FIG. 5 and illustrates the carrying out of a method in accordance with the invention.

Figure 1:
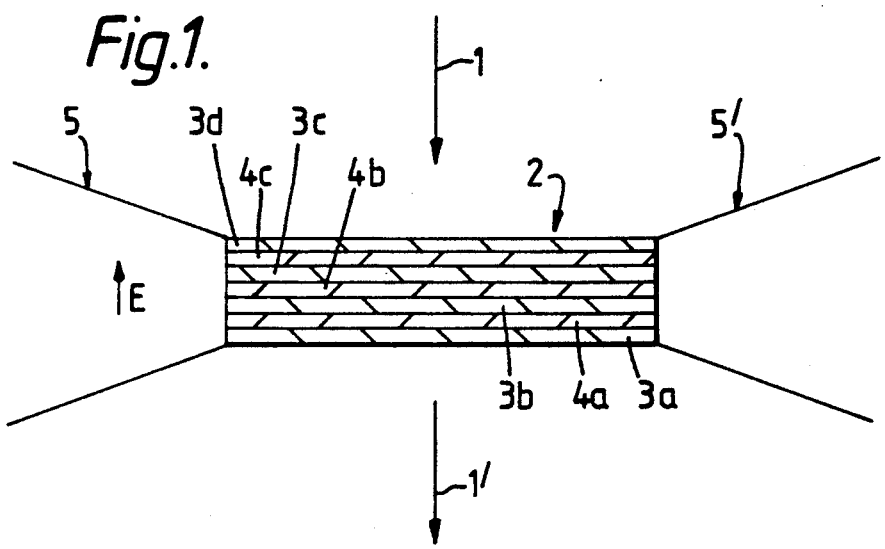
FIG. 1 is a diagrammatic cross-sectional view of an etalon structure illustrating the carrying out of a method in accordance with the invention.

It should be understood that the Figures are merely schematic and are not drawn to scale. In particular certain dimensions such as the thickness of layers or regions may have been exaggerated whilst other dimensions may have been reduced. It should also be understood that the same or similar reference numerals are used throughout the Figures to indicate the same or similar parts.

DETAILED DESCRIPTION OF THE PREFERRED EMBODIMENTS

Figure 2:
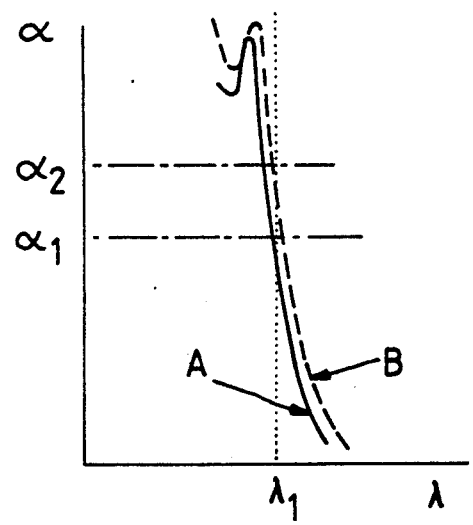
FIG. 2 is a graph of absorption $\alpha$ against wavelength $\lambda$ for explaining the operation of a method in accordance with the invention.

Referring now to the drawings, and especially FIGS. 1 and 2, a method in accordance with the invention of modulating an optical beam 1 comprises providing an etalon structure 2 having an absorption edge in the vicinity of the or a wavelength 1, that is within 3 to 40 nanometers of, (FIG. 2) of the optical beam 1 and comprising material of a smaller band gap sandwiched between layers 3 of material of a larger band gap so that the smaller band gap material forms a quantum size effect confinement region 4 for electrons and holes, directing the optical beam 1 through the quantum size effect confinement region 4 of the etalon structure 2 and directing a polarised control optical beam 5 at the etalon structure 2 with the electric field vector E of the polarised control optical beam 5 perpendicular to a direction of quantum size effect confinement of the etalon structure 2 to modulate the absorption edge of the etalon structure 2, thereby causing the optical beam 1 to be modulated by the control optical beam so producing an output amplitude modulated optical beam 1'.

As shown in FIG. 1, the quantum size effect confinement region 4 is formed as a quantum well structure. Thus, the etalon structure 2 shown in FIG. 1 comprises layers 3 of the larger band gap material alternating with layers 4 of the smaller band gap material with the layers 4 being sufficiently thin (that is of the order of the electron de Broglie wavelength or less) that quantum size effect confinement occurs in the direction of the thickness of the layers 4, that is so that each layer 4 forms a quantum well. In the arrangement shown in FIG. 1, three quantum wells 4a, 4b and 4c bounded by layers 3a, 3b, 3c and 3d of the larger band gap material are shown although of course the quantum well structure may consist of many more quantum wells or may consist of only a single quantum well 4. Also, where there are a number of quantum wells, the layers 3 bounding the quantum wells may be sufficiently thin to enable the wavefunctions of electrons and holes in adjacent wells to overlap so that the quantum wells are coupled together to form a superlattice structure or, alternatively, the layers 3 may be sufficiently thick that the quantum wells 4 are not coupled so that the structure forms a multiple quantum well structure.

The control beam 5 is polarised such that its electrical field vector E is perpendicular to the plane of the quantum well layers 4. The polarised control beam 5 provides a high frequency (optical) electric field across the quantum well layers 4 to amplitude modulate the optical beam 1 which has a wavelength just longer than, that is within 3 to 40 nanometers of, the absorption edge of the etalon structure 2.

FIG. 2 is a graph showing the variation in the absorption coefficient $\alpha$ with wavelength $\lambda$. The solid curve A in FIG. 2 shows the variation of the absorption coefficient $\alpha$ with wavelength $\lambda$ when no electric field is applied across the etalon structure 2 whilst the dashed curve B shows the variation of the absorption coefficient $\alpha$ when an electric field is applied across the quantum well layers 4 of the etalon structure 2. The absorption coefficient $\alpha$ at a wavelength $\lambda_1$ (that is at an energy just below the absorption edge) changes from $\alpha_1$ to $\lambda_2$ when the electric field is applied across the etalon structure 2.

Figure 2B:
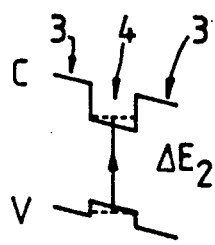
FIGS. 2a, 2b and 2c are schematic band gap diagrams illustrating the operation of a method in accordance with the invention.
Figure 2A:
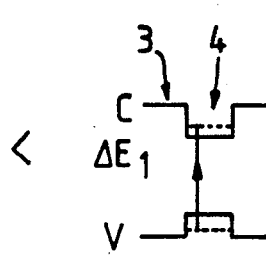
Figure 2C:
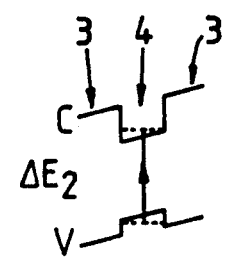

FIGS. 2a, 2b and 2c illustrate the effect of an alternating electric field on the energy band structure of a quantum well 4, with FIG. 2a illustrating the situation when there is zero applied electric field across the quantum well 4 and FIGS. 2b and 2c illustrating the situations at the positive and negative maxima of the electric field, respectively.

Thus, as illustrated schematically by FIGS. 2a, 2b and 2c, the band gap energy decreases from $\Delta E_1$ at the zero point of the electric field vector to $\Delta E_2$ at the extremum of the electric field vector E. The reduction in the band gap energy is accompanied by a shift to longer wavelength of the absorption edge as shown in FIG. 2.

Because of the quantum size effect confinement of the electrons and holes within the quantum wells, the shift of the absorption edge to longer wavelength does not result in the destruction of the exciton absorption peak, rather the shift of the exciton absorption peak is simply equivalent to the Stark shift which is observed in strongly confined hydrogen atoms when an electric field is applied. Thus, by directing a polarised optical control beam 5 at the etalon structure 2 with the electric field vector E of the polarised optical control beam 5 perpendicular to the direction of quantum size effect confinement within the etalon structure, (that is perpendicular to the thickness of the quantum well layers 4 in the arrangement described above), the so-called Quantum Confined Stark Effect which has been observed as described in the aforementioned papers by Miller et al under the application of an electrical potential bias across a quantum effect confinement region can be obtained.

In a method and apparatus in accordance with the invention by selecting the etalon structure 2 such that the wavelength $\lambda_1$ of the optical beam 1 lies in the vicinity of the absorption edge of the etalon structure, as shown the wavelength $\lambda_1$ lies in the tail of the absorption curve, and directing the polarised optical control beam 5 so that the electric field vector E is perpendicular to the or a direction of quantum size effect confinement in the etalon structure 2, the absorption coefficient $\alpha$ of the etalon structure 2 is caused to oscillate between the curve A at minimum or zero point of the electric field vector E and the curve B at the extrema of the magnitude of the electric field vector E. Thus, the absorption coefficient for the optical beam 1 oscillates between a minimum value $\alpha_1$, at the zero point and a maximum value $\alpha_2$ at each extremum of the magnitude of the electric field vector E and so the amplitude of the output optical beam 1' transmitted by the etalon structure is modulated at a frequency which is twice that of the polarised optical control beam 5. The amplitude modulated output optical beam 1' will also have side bands at $E1 \pm 2E_2$ where $E_2$ is the energy in electron volts of the polarised optical beam 5 and $E_1$ is the energy in electron volts of the optical beam 1 and the shorter wavelength side band should be strongly absorbed whilst the longer wavelength side band should be beyond the absorption edge and should therefore be transmitted. The output polarised optical control beam 5' may be used as a monitor of the operation of the etalon structure.

To take a particular example where the optical beam 1 to be modulated has a wavelength of 860 nm, the etalon structure 2 may consist of gallium arsenide (GaAs) quantum wells 4 of approximately 10 nm thickness bounded by barrier layers 3 of $Al_xGa_{1-x}As$ (where x is for example 0.35) of the same thickness, sufficient alternate barrier and quantum well layers 4 and 3 being provided to form an etalon structure, for example, of 1.3 micrometers thickness.

The etalon structure 2 may be grown by any suitable conventional technique, for example molecular beam epitaxy (MBE), metal organic vapour phase epitaxy (MOVPE) or metal organic MBE, for growing epitaxial layers of sufficient thinness on a substrate. The substrate on which the etalon structure 2 is formed may be a gallium arsenide monocrystalline substrate which is subsequently either etched completely away and replaced by a substrate transparent to the optical beam, for example a sapphire substrate as described in EP-A-135582, or which is subsequently selectively etched to define a through-hole as will be explained hereinafter with respect to FIG. 3.

Such a $GaAs/Al_{0.35}Ga_{0.65}As$ etalon structure 2 will typically have an absorption coefficient $\alpha$ of $2.4 \times 10^3 cm^{-1}$ at the 860 nm wavelength of the optical beam 1. In such a case, the polarised optical control beam 5 may be a polarised focused beam from a $CO_2$ laser providing a plane polarised optical beam 5 at a wavelength $\lambda_2$ of about 10.5 micrometers which will cause the absorption coefficient $\alpha$ of the etalon structure to oscillate between about $2.4 \times 10^3 cm^{-1}$ at the zero point of the electric field vector to about $3.3 \times 10^3 cm^{-1}$ at the extrema of the electric field vector and for an etalon structure with a thickness of 1.3 $\mu$m this will cause a modulation of 10% in the amplitude of the output optical beam 1'. In such a case, with $E_1$ equal to 1.4413 ev and $E_2$ equal to 0.117 ev, then the side bands will be at 1.6753 ev (739.9 nm) and 1.2073 ev (1.0267 $\mu$m).

Figure 3:
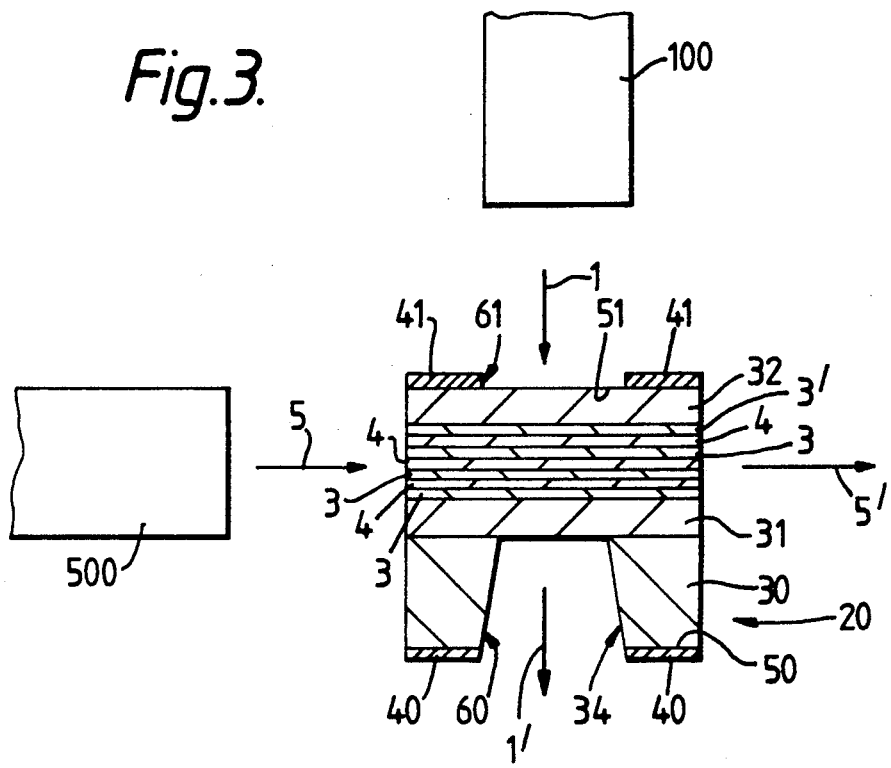
FIG. 3 is a simplified diagrammatic cross-sectional view of a first embodiment of apparatus in accordance with the invention and illustrates the carrying out of a method in accordance with the invention where a dc bias may be applied across the etalon structure.

FIG. 3 illustrates apparatus embodying the invention having a modulation structure 20 incorporating such an etalon structure 2, a first laser source 100 providing the optical beam to be modulated and a second laser source 500 providing the polarised optical control beam 5. As shown in FIG. 3, the modulation structure 20 is grown using the conventional techniques mentioned above on a highly n conductivity type doped gallium arsenide substrate 30. Before formation of the etalon structure 2, a highly n conductive type doped aluminium gallium arsenide layer 31 is grown to a thickness of, for example, approximately 0.5 micrometers on the substrate to act as an etch stop layer transparent to optical beam 1. Subsequently a not intentionally doped multiple quantum well or etalon structure 2 is grown which consists of alternate not intentionally, that is intrinsically, doped layers 3 and 4 of aluminium gallium arsenide and gallium arsenide as described above, with each layer 3, 4 being approximately 10 nm in thickness. After the desired number of quantum wells 4, for example in the range of from 10 to 100 quantum wells (only three of which are shown in FIG. 3), has been grown, the final barrier layer 3' is topped by a capping layer 32 of highly p+ conductive type doped aluminium gallium arsenide. Metal contacts 40 and 41 are then patterned and defined using conventional techniques on free surfaces 50 and 51 of the substrate 30 and capping layer 32 so as to provide windows 60 and 61 through the contacts 40 and 41 through which the optical beam 1 can pass. The gallium arsenide substrate 30 is then etched using the metal contact 40 as a mask by a conventional selective chemical etching technique which etches the n+ type gallium arsenide but not the n+ type aluminium gallium arsenide to form a passage or through hole 34 for the output optical beam 1' through the substrate 30 which is itself opaque to the optical beam 1'. The metal contacts 40 and 41 may be made, for example, by evaporating gold onto the surfaces 50 and 51 or transparent contacts of, for example, indium tin oxide may be used.

The first laser source 100 may be a semiconductor laser which may, for example, as is known in the art, have an active region formed of a gallium arsenide-gallium aluminium arsenide multiple quantum well or superlattice structure grown by conventional techniques on a gallium arsenide substrate so as to provide an optical beam 1 with a wavelength of 860 nm. As indicated above, the second laser source 500 may be a $CO_2$ laser providing a plane polarised optical beam at a wavelength of about 10.5 micrometers.

It may, however, be possible to use a semiconductor laser as the second laser source 500, providing the semiconductor laser source can be driven in a TM mode. Where necessary an appropriate polariser rotator may be provided in combination with the second laser source 500 so as to ensure that the E vector of the polarised optical control beam 5 is perpendicular to a direction of quantum size effect confinement of the etalon structure 2. In such a case, the second laser source 500 may be integrated onto the same substrate as the etalon structure 2 but of course suitably isolated therefrom.

A dc bias may be applied across the etalon structure by virtue of the contacts 40 and 41 to shift the absorption curve of the etalon structure to shorter or longer wavelengths as required so enabling the wavelength of the optical beam to be modulated to be selected. Using such an arrangement, it would be possible to select, by applying an appropriate dc bias, one particular wavelength to be modulated from a beam containing many different wavelengths.

Figure 4:
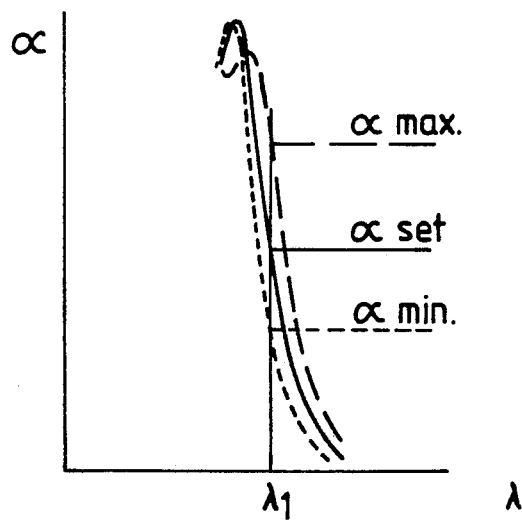
FIG. 4 is a graph of absorption $\alpha$ against wavelength $\lambda$ similar to FIG. 2 and illustrating the effect of applying a dc bias across the etalon structure.

FIG. 4 illustrates the case where the absorption curve has been moved by an applied negative dc bias so that, at the wavelength $\lambda_1$ desired to be modulated, the absorption coefficient of the etalon is $\alpha$ set and the absorption coefficient increases to α max during the negative half cycle of the electric field vector E and decreases to α min (which may be the absorption coefficient for a wavelength of $\lambda_1$ at zero bias if the electric field of the polarised optical control beam 5 cancels out the dc bias or may be between the zero bias condition and the dc bias condition if the electric field is not sufficiently strong to cancel out the dc bias) during the positive half cycle of the electric field vector E. Thus, when a dc bias is applied, the amplitude modulation will be at the same frequency as the frequency of the polarised optical control beam 5. For the arrangement described above with reference to FIG. 1, that is with $\lambda_1$ equal to 860 nm and $\lambda_2 = 10.5$ μm then the amplitude modulation will be at the same frequency as the polarised optical control beam 5 with side bands at 1.5583 ev (795.4 nm) and 1.3243 ev (935.9 nm).

FIG. 5 is a block schematic diagram of a different arrangement of apparatus for carrying out a method in accordance with the invention. In this example, the etalon structure 2a is formed so as to be elongate in one direction in the plane of the quantum wells 4 and the first and second laser sources 100a and 500a are arranged so as to provide optical beams lying in the plane of the quantum wells 4. Thus, the first laser source 100a is arranged so as to direct the optical beam 1a to be modulated along the quantum wells 4 parallel to the length of the etalon structure whilst the second laser source 500a is arranged to 1 direct the polarised optical control beam 5a perpendicularly of the length of the etalon structure with, of course, the electric field vector E of the polarised optical control beam 5a perpendicular to the direction of quantum size effect confinement, that is perpendicular to the thickness of the quantum wells 4.

FIG. 6 is a schematic perspective view illustrating in greater detail the etalon structure 2a of the apparatus shown in FIG. 5. Thus, as shown in FIG. 6, the elongate etalon structure 2a is sandwiched between two layers 31a and 32a and is formed by selective etching as an elongate mesa 20 on a substrate 30a.

In a method embodying the invention using the apparatus illustrated in FIGS. 5 and 6, the optical beam 1a is directed along the length of quantum wells 4 so that the etalon structure 2a acts as a waveguide for the optical beam 1a and the polarised optical control beam 5a is directed perpendicularly of the length of the quantum wells 4. Such a structure has the advantage of being more sensitive to modulation by the polarised optical control beam 5 because of the increased optical path length for the optical beam 1a in the etalon structure 2a. Although not shown, electrical contacts may be provided as described above on the free surfaces 50a and 51a so as to enable a dc bias to be applied, if desired.

The etalon structure 2a may be formed in a similar manner to and of similar materials as the etalon structure 2 with the only difference being the formation of the mesa structure 20 as mentioned above. Thus, the substrate 30a may be a gallium arsenide substrate whilst the layers 31a and 32a may be aluminium gallium arsenide layers and the etalon structure 2a may be a multiple quantum well or superlattice structure formed of alternate gallium arsenide and gallium aluminium arsenide layers. The first laser source 100a may in this example be formed on the same substrate 30a as the etalon structure 2a so as to be isolated from the etalon structure 2a and may have an active region formed as a gallium arsenide-gallium aluminium arsenide multiple quantum well or superlattice structure tailored to provide an optical beam 1a with a desired wavelength to be modulated. The second laser source 500a may similarly be integrated onto the same substrate 30a provided it is possible to drive the second laser source 500a as a TM mode laser. An array of etalon structures 2 or 2a may be provided with the etalon structures being for example, designed to be suitable for modulating different wavelengths by adjusting the absorption edge by tailoring the composition of the quantum size effect confinement region and/or by applying different dc biases to different etalon structures. Such a structure should have applications in, for example, optical signal processing.

The polarised optical control beam 5 may be a continuous beam or may be pulsed so that modulation occurs only during the pulses of the beam. In this manner information in the pulsed beam may be impressed onto the optical beam 1. Also the side band frequencies may be used for communication or data processing, for example, by using a longer wavelength polarised optical control beam 5, it may be possible to provide side bands closer to the wavelength of the optical beam 1 or to generate coherent beams in the mid infra-red range by using two beams in the visible to near infra-red.

The etalon structure 2 may be formed of any material suitable for providing a quantum size effect confinement region for both electrons and holes. Thus, for example, the quantum effect confinement region may be formed by other III-V materials. For example, the quantum wells 3 may be formed of InGaAlAs or InGaAsP with barrier layers of InP or of GaSb with barrier layers of AlGaSb. Also, a superlattice formed of alternate silicon and germanium layers could be used to form the quantum size effect region. The quantum size effect confinement region need not necessarily be a quantum well structure but could be formed by quantum wires or quantum dots using the same or similar materials to those mentioned above. Where the quantum size effect confinement region is formed of quantum wires or quantum dots then the electric field vector of the polarised control optical beam is arranged to be perpendicular to a direction of quantum size effect confinement.

From reading the present disclosure, other modifications will be apparent to persons skilled in the art. Such modifications may involve other features which are already known in the art and which may be used instead of or in addition to feature already described herein. Although claims have been formulated in the application to particular combinations of features, it should be understood that the scope of the disclosure of the present application also includes any novel feature or any novel combination of features disclosed herein either explicitly or implicitly or any generalisation of one or more of those features, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

I claim:

1. A method of modulating an optical beam, which method comprises providing an etalon structure having an absorption edge in the vicinity of the wavelength of the optical beam and comprising material of a smaller band gap sandwiched between layers of material of a larger band gap so that the smaller band gap material forms a quantum size effect confinement region for electrons and holes, directing the optical beam through the quantum size effect confinement region of the etalon structure and directing a polarised control optical beam at the etalon structure with the electric field of the polarised control optical beam perpendicular to a direction of quantum size effect confinement of the etalon structure for causing the absorption edge of the etalon structure and the amplitude of the optical beam to be modulated by the control optical beam at a frequency which is twice the frequency of the polarised control optical beam.

2. A method according to claim 1, which comprises providing the quantum size effect confinement region of the etalon structure as at least one quantum well.

3. A method according to claim 2, which comprises providing the quantum size effect confinement region of the etalon structure as a multiple quantum well structure.

4. A method according to claim 1, which comprises directing the optical beam through the quantum size effect confinement region perpendicularly of the layers of the etalon structure.

5. A method according to claim 1, which comprises directing the optical beam through the quantum size effect confinement region parallel to the layers of the etalon structure.

6. A method according to claim 1 which comprises applying a direct current bias potential across the etalon structure.

7. A method according to claim 6, which comprises applying the bias potential perpendicularly of the layers of the etalon structure.

8. Apparatus for modulating an optical beam, which apparatus comprises an etalon structure having an absorption edge in the vicinity of the wavelength of the optical beam to be modulated and comprising material of a smaller band gap sandwiched between layers of material of a larger band gap so that the smaller band gap material forms a quantum size effect confinement region for electrons and holes, and means for directing a polarised control optical beam at the etalon structure with the electric field of the polarised control optical beam perpendicular to a direction of quantum size effect confinement of the etalon structure for causing the absorption edge of the etalon structure and the amplitude of an optical beam passing through the quantum size effect confinement region to be modulated by the control optical beam at a frequency which is twice that of the frequency of the polarised control optical beam.

9. Apparatus according to claim 8, wherein the quantum size effect confinement region of the etalon structure comprises at least one quantum well.

10. Apparatus according to claim 9, wherein the quantum size effect confinement region of the etalon structure comprises a multiple quantum well structure.

11. Apparatus according to claim 8 which comprises means for applying a direct current bias potential across the etalon structure.

12. Apparatus according to claim 11, wherein the means for applying the bias potential comprises electrical contacts provided on opposed surfaces of the etalon structure.

* * * * *